United States Patent [19]

Wakamiya et al.

[11] Patent Number: 4,666,394
[45] Date of Patent: May 19, 1987

[54] APPARATUS FOR THERMALLY FIXING THE FORMED THERMOPLASTIC PRODUCTS

[75] Inventors: Sukeyoshi Wakamiya; Naokazu Takeuchi, both of Nagoya; Yoshihisa Hama; Tatsu Akashi, both of Otsu; Tatsuo Shimura, Takashima, all of Japan

[73] Assignees: Mitsubishi Jukogyo Kabushiki Kaisha, Osaka; Toyo Boseki Kabushiki Kaisha, Tokyo, both of Japan

[21] Appl. No.: 699,153

[22] Filed: Feb. 6, 1985

[51] Int. Cl.⁴ .................. B29C 51/10; B29C 51/18
[52] U.S. Cl. .................. 425/342.1; 264/549; 264/551; 425/384; 425/387.1; 425/388
[58] Field of Search ........ 264/544, 547, 553, 549–551; 425/384, 387.1, 388, 342.1

[56] References Cited

U.S. PATENT DOCUMENTS 3,496,143  2/1970  Siggel et al. .................. 264/549 X
4,165,357  8/1979  Vetter .......................... 264/553 X
4,385,089  5/1983  Bonnebat et al. ............... 264/537 X
4,582,665  4/1986  Jabarin ......................... 264/553 X Primary Examiner—Jan H. Silbaugh
Assistant Examiner—Karen D. Kutach
Attorney, Agent, or Firm—Wenderoth, Lind & Ponack

[57] ABSTRACT

A process and apparatus for pneumatic-pressure forming or vacuum/pneumatic-pressure forming a web of thermoplastic material into a matrix form of containers and having the thus-formed plastic product processed with a thermal fixation operation, which comprises in combination the steps of holding a forming mold at a thermal fixing temperature for the plastic to be formed so as to have the matrix of containers thermally fixed through a temperature range characteristic of the plastic; and cooling-off thus-formed plastic containers, while maintaining the interior of the formed plastic containers at such a pressure level that the formed plastic containers are no longer subjected to any risk of deformation after the forming mold is removed, and after having been removed from the engagement with the forming mold.

1 Claim, 13 Drawing Figures

APPARATUS FOR THERMALLY FIXING THE FORMED THERMOPLASTIC PRODUCTS

BACKGROUND OF THE INVENTION

1. Field of the Invention

The present invention relates generally to an improved heat conditioning technology for thermoplastic resin products, and more particularly to an improved heat conditioning or fixing treatment for use with the thermoplastic resin products, which is applicable in practice to pneumatic pressure forming, vacuum-pneumatic pressure forming or like thermoforming of general plastic film and sheet products, etc.

2. Description of the Prior Art

There is generally known a variety of containers which are thermoformed from thermoplastic film and/or sheet products and which are extensively used as containers for containing foodstuff products. Also, there is known a process by which such containers are formed thermally from thermoplastic film or sheet materials by way of the vacuum forming, pneumatic pressure forming, or by way of combination of these two forming processes.

Here, before going any further, it will be helpful for the readers to give in summary a general introductory explanation on certain specific matters concerned with the prior art vacuum-and-pneumatic pressure processes and apparatus for thermally forming the thermoplastic resin products, for a better understanding of the present invention.

FIG. 1 is a general schematic view showing the general outline of the conventional vacuum and pneumatic-pressure thermoforming machines and of the conventional processes of thermoforming. FIGS. 2, 3 and 4 are schematic perspective views showing the general state of a series of containers formed in a matrix relationship in a sheet of conventional thermoplastic material, showing a plastic container product stamped away from the sheet of thermoplastic material including the series of containers therein, and showing a scrap of the thermoplastic sheet from which the plastic containers have been stamped away, respectively.

Now, in the drawing figures mentioned above, there is shown a roll of plastic film or sheet material designated at the reference numeral 1, which is in an elongated web form and is wound in a roll fashion to be supplied for the series of thermoforming processes to follow. There is unrolled a sheet of plastic sheet material designated at 2 out of the roll of plastic material 1. There are also shown a pair of heating panels designated at 3 and 4, which are disposed operatively in an opposed relationship with respect to each other and which are designed to heat the sheet of plastic material 2 to its softening point through a temperature range characteristic of the plastic so as to be formable or moldable thermally while passing therebetween. Also shown is a forming mold at the reference numeral 5 having passageways for sucking or pumping out air at 14 while generating a vacuum state in the interior of the forming mold 5. There are also provided cooling and heating means not shown.

There are disposed a series of plugs designated at the reference numeral 6 in an opposed relationship respectively with the series of molding cavities of the forming mold 5, which are adapted to force the web of plastic sheet 2 into each of the molding cavities of the forming mold 5 for a preliminary molding procedure and which are provided with a plurality of air blowing passageways 12. For containers with a shallow depth, it is sometimes the case that the containers may be formed to their designed shapes without using these plugs. There is shown a container at 7 in FIGS. 1, 2 and 3, which is a typical representation of a container product formed in a thermoplastic manner.

A scrap of plastic sheet is shown at the reference numeral 8 in FIG. 4, from which a plurality of containers 7 have been stamped away and in which there are left a plurality of openings after the stamping operation. Also shown in FIG. 1 are upper and lower stamping dies designated at 9, 10 disposed in an opposedly paired relationship with respect to each other, a pneumatic control device at 11 for the generation and control of compressed air and for the shifting control of air suction operation, a vacuum generating device at 13, a plastic sheet carrier 15 for carrying the sheet of plastic material in the interior of a vacuum-and-pneumatic pressure forming device, a vacuum-and-pneumatic pressure forming device 18, and a plastic product stamping unit 19.

Referring more specifically to the thermoplastic forming process by way of FIG. 1, firstly there is seen unrolled intermittently a sheet of plastic material 2 out of the roll of plastic material 1 by means of the plastic sheet carrier 15. Subsequently, as it moves between heat panels 3 and 4, the sheet of plastic material 2 is heated to its softening point or its molding temperature by the paired upper and lower heating panels 3, 4 so as to be formed thermoplastically. There is sometimes a case that the sheet of plastic material 2 is heated on one side only with either of the upper and lower heating panels 3, 4, where so desired. At the following step, the forming mold 5 and the plurality of plugs 6 are then caused to move toward each other or in the direction shown by the arrows X1 and Y1, respectively, so that the sheet of plastic material 2 may be sandwiched and clamped therebetween to the designed molding shape of a formed plastic product, accordingly.

In the next stage, the steps of pumping out the air in the openings or cavities of the forming mold 5 through the passageways 14 and of air blowing forced in compression into the forming mold cavities are then taken concurrently so as to force the sheet of plastic material 2 into the cavities of the forming mold 5 and have the plastic sheet formed to the desired shape of a container 7, accordingly.

Next, thus-formed containers 7 are then cooled off by cooling the forming mold 5 while keeping the containers in close contact position against the interior of the molding cavities by the aid of air blowing in compression from the companion plugs 6.

At the following step, the forming mold 5 and the companion plugs 6 are caused to move backwardly away from their engaging positions in the directions as shown by the arrows X2 and Y2, respectively, so as to have the forming mold 5 opened, and the containers 7 formed in a matrix fashion in the sheet of plastic material 2 are now ready to be removed out of the forming mold 5 together with their matrix formation as it is. (see FIG. 2.)

After the containers 7 are removed together out of the forming mold 5, they are carried to the formed product stamping unit 19, where they are separated or stamped to their individual or piece shape from the sheet of plastic material 2 by operation of the pair of upper and lower stamping dies 9, 10. More specifically, the sheet of plastic material 2 with the matrix of containers formed therein is now stamped to be separated into the containers 7 shown in FIG. 3 and the plastic sheet scrap 8 shown in FIG. 4, respectively.

Such containers as obtained from the vacuum and pneumatic forming processes of the conventional art as noted above in connection with FIG. 1, may hold their shapes in practice as long as they are used in a normal temperature range. However, there is left an inevitable drawback in such containers according to the conventional forming processes as noted above; that is, when these containers are subjected to a certain high temperature while being charged with a hot content, or sterilized in a high temperature environment after charged with a content, the containers would be deformed owing to its thermoremanent strain from the thermoforming procedures, which would not only spoil the goods' value, but would no longer serve any due function of a container.

In order to overcome such drawback, which is particular to the conventional thermoforming processes, it is then essential to provide these products with a proper thermal resistance. In order to provide the required heat-resisting properties, it is the generally known practice for fibrous and film products that they heated in the presence of tension for the purpose of thermally fixing them.

The present invention is essentially directed to a resolution to such inconveniences and difficulties as outlined above and experienced in the adoption of the conventional thermoforming processes.

SUMMARY OF THE INVENTION

It is therefore a primary object of the present invention to provide an improvement in or relating to the thermal fixing process, which is simple in practice and which is readily adaptable to the general thermoforming operations of plastic containers from a web of thermoplastic resin material by way of the vacuum and/or pneumatic pressure molding processes for the thermoplastic materials.

This particular object of the invention can be attained efficiently from the improved process for thermal fixation, as may be summarized in brief, for use in line with the pneumatic pressure and/or the pneumatic-pressure/vacuum forming processes for the production of containers from a web of thermoplastic material, which comprises in combination the steps of holding a forming mold at a thermal fixing temperature for the plastic to be formed so as to have the matrix of containers thermally fixed through a temperature range characteristic of the plastic; and cooling-off thus-formed plastic containers, while maintaining the interior of the formed plastic containers at such a pressure level that the formed plastic containers are no longer subjected to any risk of deformation after the forming mold is removed, and after having been removed from the engagement with the forming mold.

It is another object of the present invention to provide an improved apparatus for thermal fixation, as may be summarized in brief, for use in line with the pneumatic pressure and/or the pneumatic-pressure/vacuum forming processes for the production of containers from a web of thermoplastic material, which comprises, in combination, carrier means adapted to unwind the plastic sheet from a roll thereof and to carry the plastic sheet through thermoforming, thermal fixing and output stations; forming mold means held at a thermal fixing temperature for the plastic material and equipped with heating and air compression means; means including counterpart plugs and seal plate means adapted to operatively engage with the forming mold means so as to have the interior of the plastic containers positively sealed and disengage such operative engagement with the forming mold so as to displace outwardly from the mold means; means adapted to operatively control the pneumatic pressure source in such a manner that the pressure in the interior of the plastic containers may be held at a relatively high level during the period of the thermoforming and thermal fixation procedures, while the pressure may be held at a relatively low level during the cooling procedure; and forced cooling means adapted to positively cool-off the plastic containers from the after being outside thereof processed with the thermal fixation procedure.

The principle, nature and details of the present invention will, as well as advantages thereof, become more apparent from the following detailed description by way of a preferred embodiment of the invention, when read in conjunction with the accompanying drawings, in which like parts are designated at like reference numerals.

DETAILED DESCRIPTION OF THE PREFERRED EMBODIMENT

The present invention will now be described in detail by way of example on a preferred embodiment thereof in conjunction with the accompanying drawings, as follows.

Figure 7:
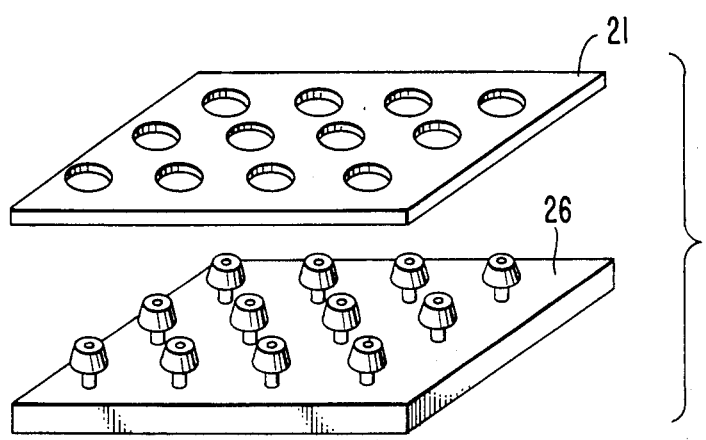
FIG. 7 is a schematic perspective view showing the mutual relation of component forming plugs and a scrap of plastic sheet material with the formed containers stamped away.
Figure 5:
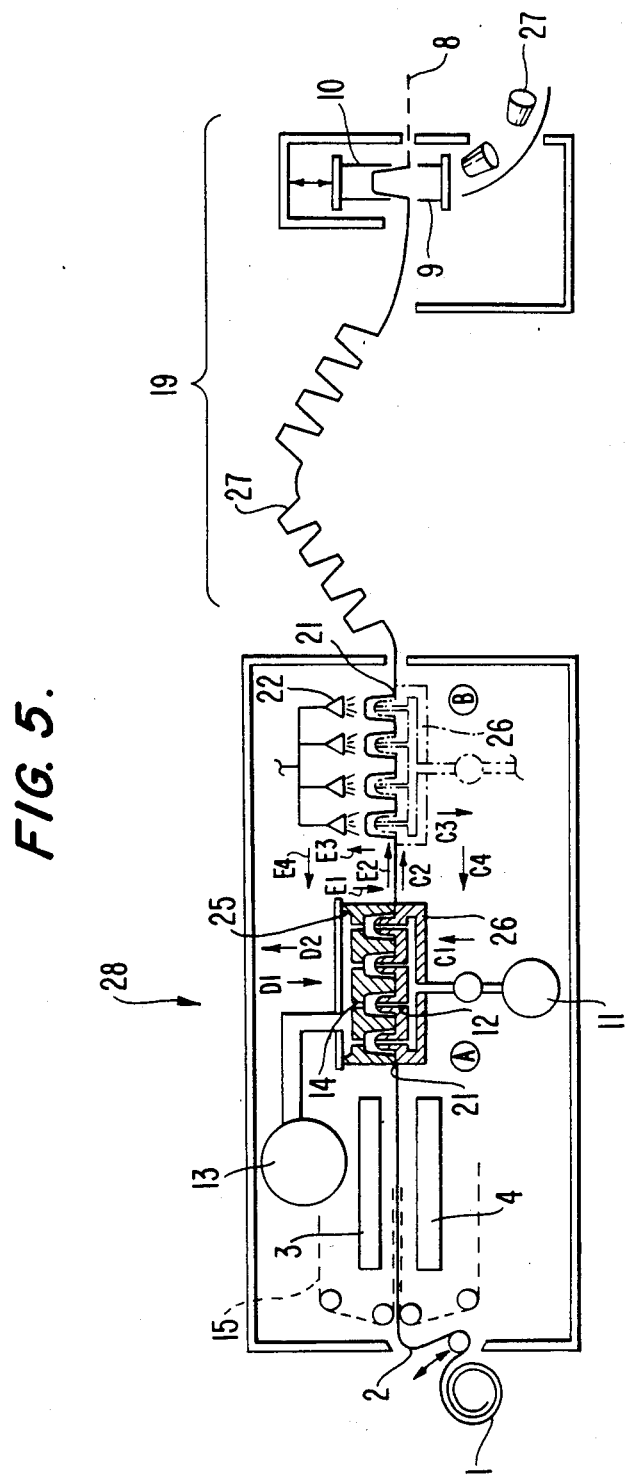
FIG. 5 is a schematic general view similar to FIG. 1, showing the general layout of a thermal fixation system for thermally fixing thermoformed plastic products according to the apparatus of the present invention by way of a preferred embodiment thereof.

Now, referring to FIGS. 5 and 7, there is shown by way of a preferred embodiment of the apparatus of the present invention, the construction of an improved thermal fixation system, and referring to FIG. 6, there is shown the sequence of thermoforming and thermal fixing processes by way of a preferred embodiment of the method of the invention. In FIG. 5, there are shown like parts designated at like reference numerals 1 through 4, and 8 through 15 as in FIG. 1.

In the first place, it is to be noted that the substantial difference in construction and in operating sequence of the improved system according to the present invention from the conventional vacuum/pneumatic pressure forming system resides in the following points. That is, it resides in the aspect that there is provided a companion or counterpart plug mold 26 adapted to move in reciprocating motion between a thermoforming station A and a cooling station B (as shown in FIG. 5) in the interior of an improved vacuum/pneumatic pressure forming and thermal fixing apparatus 28 according to the present invention along the route and direction shown by the arrows C1 through C4. Also, there exists another substantial difference in the general construction of the improved system of the invention. Specifically, there are provided a sealing plate 21, which is adapted to be interlocked in operative motion to the companion plug mold 26 in the directions shown by the arrows E1 through E4, and a cooling station B which is added particularly for effecting a multiple-stage control of the air blowing pressures, which can afford two or more stage control.

Figure 1:
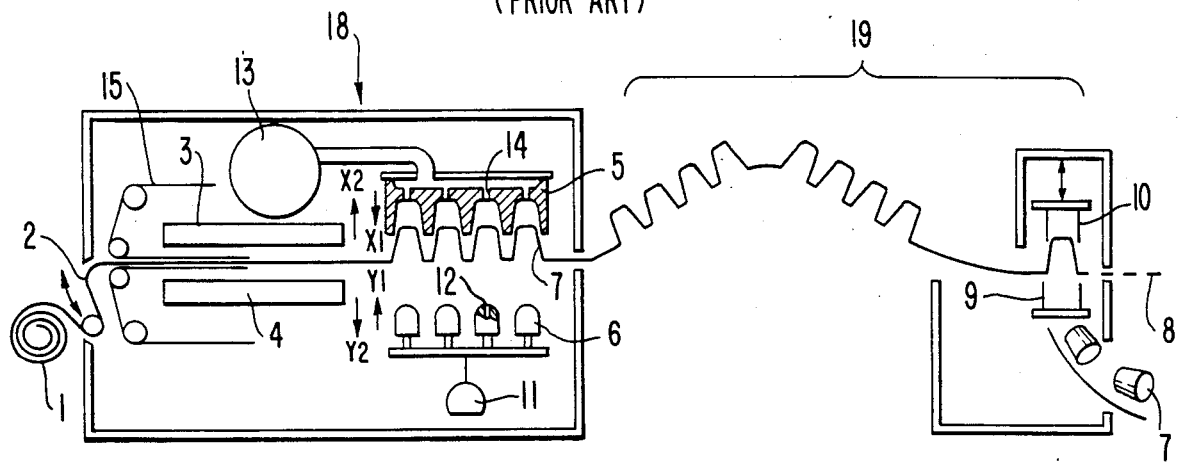
FIG. 1 is a schematic general view showing, in longitudinal cross section, a typical construction of a conventional vacuum/pneumatic-pressure forming machine adapted to perform a process of thermoforming plastic containers from a web of thermoplastic material.
Figure 2:
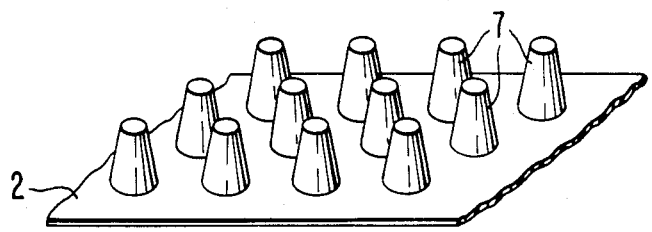
FIG. 2 is a schematic perspective view showing the general state of a series of containers formed in a matrix relationship in a sheet of conventional thermoplastic material.
Figure 3:
FIG. 3 is a perspective view showing a plastic container product stamped away from the sheet of thermoplastic material including the series of containers therein.
Figure 4:
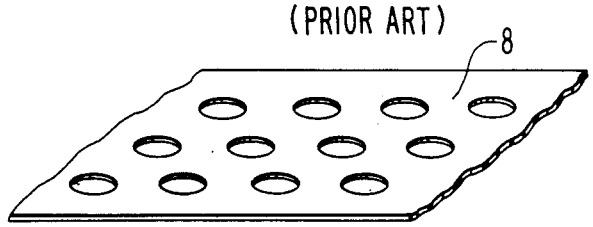
FIG. 4 is a perspective view showing a scrap of the thermoplastic sheet from which the plastic containers have been stamped away.

Now, referring more specifically to FIGS. 5 through 7, there are shown the roll of plastic material designated at the reference numeral 1, the sheet of plastic material designated at 2, and the pair of opposedly disposed upper and lower heating panel 3, 4, all of which are identical with those shown in FIG. 1. There is also shown a thermoforming and thermal fixing mold designated at 25, which is provided with the plurality of air venting or vacuum drawing passageways 14, one for each cavity of the mold, and also provided with a heating device and a temperature regulator device not shown, which are adapted to the thermal fixation procedure. Optional means may be provided to cause the forming mold 25 to be moved in reciprocating motion in the directions at right angles with respect to the running direction of the sheet of plastic material 2 as shown by the arrows D1 and D2 in such a manner that there is accordingly produced a clamping force in operative engagement with the companion plug mold 26.

The companion plug mold 26 is provided with the plurality of air blowing passageways 12 and cooling means not shown, and the mold is constructed such that it may be caused to travel in a rectangular path as shown typically by the arrows C1 through C4, while holding the operative interconnecting relationship with the air compression unit 11. There are also seen a matrix of heat-resisting plastic containers 27, which was already formed thermally with the thermal fixing operation, the scrap of thermoplastic sheet 8 being separated from the containers with the paired upper and lower stamping dies 9, 10.

The air compression unit 11 is adapted to function to produce the desired compressed air and to provide a multiple-stage (two or more stages) control of thus-formed air compression. In FIG. 5, there are also shown the vacuum generating device designated at 13, the plastic sheet carrier 15 for carrying the sheet of plastic material in the interior of the vacuum/pneumatic pressure forming apparatus, the sheet stamping device 10, the vacuum/pneumatic pressure forming and thermal fixing apparatus 28 according to the present invention, and a cooling unit 22 for cooling the formed containers by apply cooling air to the outside.

Now, reviewing the operation, the steps of unwinding the sheet of plastic material 2 from the roll of plastic material 1 so as to be heated and of stamping the thermally formed matrix of containers away from the sheet of plastic material 2 are identical with those in the like procedures in the conventional thermoforming system, so an explanation is omitted for brevity. The operating procedures of thermoforming, thermal fixing, cooling and withdrawing of the thermoplastic container product are to be explained below in conjunction with FIGS. 6(a)–6(g).

Figure 6A:
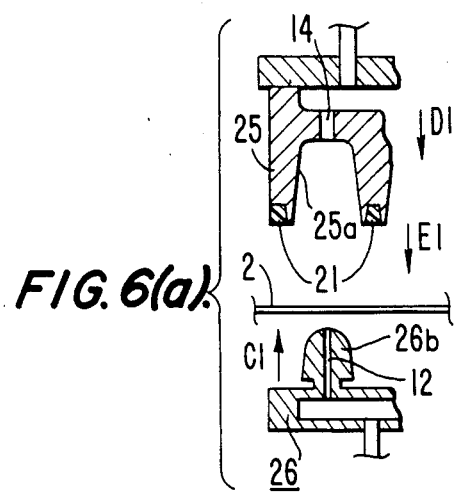
FIGS. 6(a) through 6(g) are fragmentary views showing, in cross section, a sequence of thermoforming procedures in performing the method of the present invention.
Figure 6B:
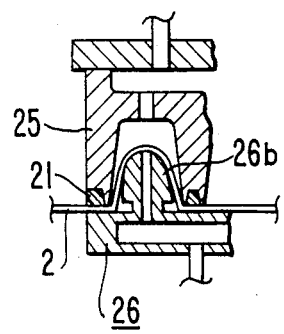

Referring firstly to the thermoforming procedures of the plastic sheet material, it is seen that when the preheated sheet of plastic material 2 is carried into the working position between the heated forming mold 25, the sealing plate 21 and the companion plug mold 26 as shown in FIG. 6(a), the forming mold 25, the sealing plate 21 and the companion plug mold 26 are caused to move in the direction of the arrows D1, E1 and C1, respectively, so that they come to an operative engaging position with respect to each other and are put together to clamp and sandwich the sheet of plastic material 2 therebetween into the operative position as shown in FIG. 6(b).

At the next stage, either concurrently with or a little later than the clamping step (the present embodiment shows the concurrent step), the companion plug mold 26 is brought to be urged against the sheet of plastic material 2 (FIG. 6(b)) for a preliminary forming procedure. This preliminary step of forming is not necessarily required for the case of a container of a relatively shallow depth.

Figure 6C:
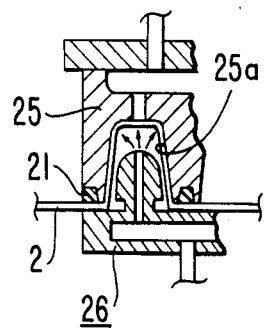

Next, the sheet of plastic material 2 is forced snugly into the inner wall surface 25a of the forming mold 25 by cooperative function of vacuum drawing and compressed air blowing on the part of the forming mold 25 and the companion plug 26, respectively, (FIG. 6(c)), so that the desired vacuum-and-pneumatic pressure forming operation may be effected. At this moment, the thus-formed sheet material is held in close contact with the forming mold 25 under the blowing effect of air from the companion plug mold 26 for a period of time, which is sufficient to relieve the thermoremanent strain in the plastic material with heat from the forming mold. A current air blowing pressure may be defined to be a "primary pressure", and a period of time for holding such blowing condition may be defined as a "thermal fixing time". In the next stage, a current pressure level existing in the inside of the thermoformed container may be decreased to a point where there is no possible expansion of the container product owing to the current inside pressure existing therein, when opening the forming mold, and where there is no possible shrinking by the effect of heat shrinking on the part of the formed plastic product, which pressure point may be defined as a "secondary pressure" and which is much smaller than the primary pressure as defined above.

Figure 6D:
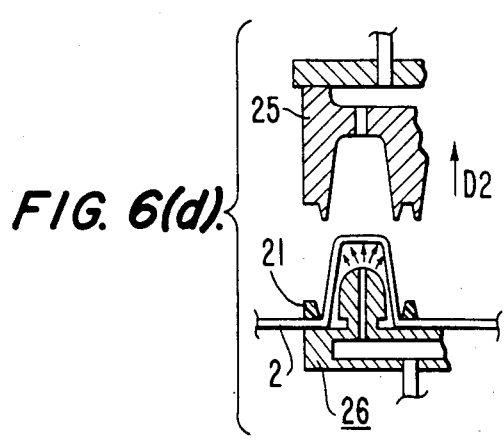

Now at the following step, the forming mold 25 is then moved in the direction shown by the arrow D2, while holding the secondary pressure level, to a position where the forming mold 25 is opened (see FIG. 6(d)). At this moment, the sealing plate 21 functions to hold the sheet of plastic material 2 in cooperation with the companion plug mold 26 so that the inside pressure of the formed containers may effectively be maintained as it is.

Figure 6E:
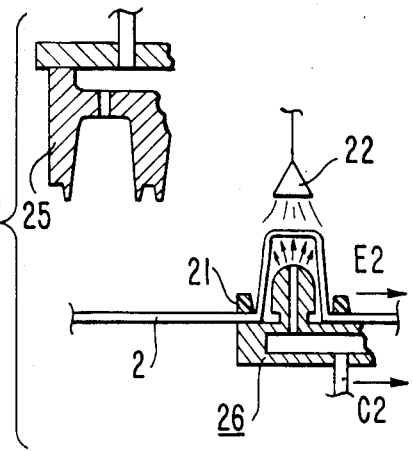

Subsequently, while maintaining the secondary pressure in the interior of the formed containers with the hermetically cooperating engagement between the companion plug mold 26 and the sealing plate 21, the sheet of plastic material 2 with thus-forming containers is then carried in the directions as shown by the arrows C2, E2 toward the cooling station B, where the formed containers are cooled from the outside by the cooling device 22 down to a temperature point at which there occurs no deformation if the interior pressure is discharged. A period of time that is required for such cooling to the state noted above may be defined as a "cool-off time". It is practicable that there may be provided another set of companion plugs and a sealing plate, not shown in this embodiment, so that the steps (a) through (c) may be conducted in parallel by using the forming mold 25 left standing in the lefthand position as seen in FIG. 6(e), which maintains a current temperature level upon releasing of the formed container.

Figure 6F:
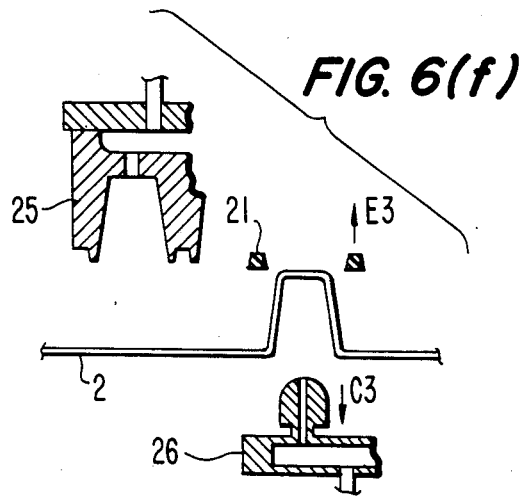
Figure 6G:
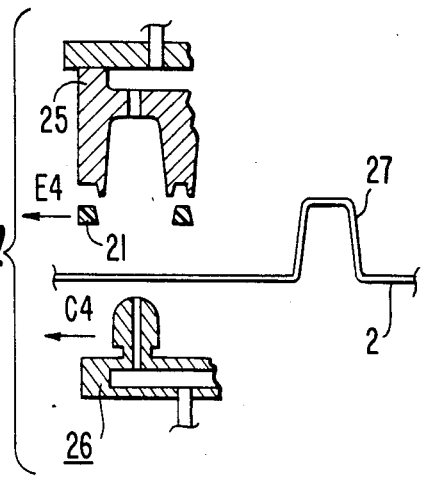

After the web of plastic material with the formed containers therein is cooled off, the secondary pressure is discharged from the interior of the containers to return the interior to atmospheric pressure, and then the companion plug mold 26 and the sealing plate 21 are caused to move in the directions as shown by the arrows C3 and E3 in FIG. 6(f), respectively, so that the plurality of containers 27 formed in the matrix form in the plastic sheet 2 may be withdrawn as a whole as shown in FIG. 6(g).

Next, the matrix of containers 27 formed in the plastic sheet 2, which has now been finished with completion of the thermal fixing procedure, is then delivered to the stamping station. At this stage, the companion plug mold 26 and the sealing plate 21 are now caused to return to their original positions in the vicinity of the heating and forming mold 25 by travelling in the directions shown by the arrows C4 and E4, respectively, and then there will be repeated the same working cycle starting with the step as shown in FIG. 6(a).

Now, according to such a unique construction and operation of the thermal fixation system as adaptable to the general thermoplastic forming line, as typically shown by way of the preferred embodiment of the present invention in shown FIGS. 5 and 6, the thermal fixation process may be conducted so as not to cause any interruption in line during the thermoforming process on the plastic sheet material for the continuous production of the plastic containers. By virtue of such an advantageous feature that the forming mold can be held at an optimal thermal fixing temperature in accordance with the temperature range characteristic of a thermoplastic resin to be worked, thus requiring no repeated cycle of heating and cooling on the part of the forming mold, it is now clear that the operational cycle of thermoforming work can be cut to be substantially short, and hence, the loss in the total work energy to be spent by the overall thermoforming line can then be minimized as far as possible.

In contrast, when the plastic containers of the type noted here are to be put to the thermal fixing procedure in accordance with the practice of the conventional art, the forming molds are heated to a thermoformable point of the plastic resin to be involved, into which such plastic sheet material is forced in close contact relationship, and the forming molds are held at that temperature for the thermal fixing period of time required for the plastic material. Thereafter, the forming molds are cooled-off while keeping the interior pressure of the formed containers as it is and then the interior pressure is released and the forming mold is cooled to a temperature level of which the formed containers are no longer subjected to the risk of deformation when released from the molds. Finally, the containers being withdrawn out of the mold. According to such a molding operation of the conventional art, there is repeated the cycles of heating and cooling on the part of the forming molds, which is, in the case of polyester sheet material, for instance, the recycle of temperatures between 150° and 60° C. In this exemplary case, the period of time required in one cycle of heating and cooling of the forming mold will be as long as ten minutes or so.

In comparison, with the advantageous process according to the present invention, it was found that the required time may only be three to five seconds, which is nothing more than the period of time required for a working cycle of relieving the thermoremanent strain in the formed polyester sheet. As a consequence, therefore, the present invention is advantageous in that there is no need for the undesired cycles of heating and cooling on the part of the forming molds, it being maintained merely at a certain temperature (a thermal fixing point of the plastic)), and that the forming mold can then be made simple in construction and easy to maintain.

It is now clear that the objects as set forth hereinbefore among those made apparent from the preceding description are efficiently attained, and while the present invention has been explained by way of the preferred embodiments thereof, it is to be understood that many changes and modifications may be made in the foregoing teaching without departing from the spirit and scope of the invention, and it is intended that all matter contained in the foregoing description or shown in the accompanying drawings shall be interpreted as illustrative and not in any way a limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A thermal-fixing apparatus for use in a pneumatic-pressure or vacuum/pneumatic-pressure system for thermally forming a matrix of containers from a sheet of thermoplastic resin, the apparatus comprising:
a thermoforming and thermal fixing station having a forming mold;
means for thermoforming and thermally fixing a matrix of containers in said forming mold, said thermoforming and thermally fixing means including
means for heating the containers in said forming mold during thermoforming and thermally fixing of the matrix of containers, said heating means including means for heating the matrix of containers at a thermal fixing temperature in said forming mold during thermal fixing of the matrix of containers,
means, including counterpart plugs and a seal plate means disengagably engagable with said forming mold, for sealing the interiors of the plastic containers formed in said forming mold, and
means for applying high pneumatic pressure through said plugs to the interiors of the containers while the containers are being heated by said heating means during thermoforming and thermally fixing of the matrix of containers;

means for disengaging said plugs from said forming mold and displacing said plugs and the matrix of containers outwardly of said forming mold and to a cooling station such that the exterior of the containers is exposed;

cooling means for applying a cooling fluid to the exterior of the containers displaced to said cooling station, so as to cool the containers, said high pneumatic pressure applying means including means for applying a reduced pneumatic pressure lower than the high pneumatic pressure, through said plugs to the interiors of the containers while the containers are being cooled by said cooling means; and carrier means for unwinding the sheet from a roll thereof and carrying the unwound sheet through said thermoforming and fixing station and said cooling station.

* * * * *